(12) United States Patent
Hawig

(10) Patent No.: US 11,001,696 B2
(45) Date of Patent: May 11, 2021

(54) UV-RESISTANT SUPERHYDROPHOBIC COATING COMPOSITIONS

(71) Applicant: Southwire Company, LLC, Carrollton, GA (US)

(72) Inventor: Yuhsin Hawig, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/511,481

(22) Filed: Jul. 15, 2019

(65) Prior Publication Data

US 2019/0338102 A1 Nov. 7, 2019

Related U.S. Application Data

(63) Continuation of application No. 14/745,384, filed on Jun. 20, 2015, now Pat. No. 10,370,514.
(Continued)

(51) Int. Cl.
*C09D 127/12* (2006.01)
*C08K 3/30* (2006.01)
(Continued)

(52) U.S. Cl.
CPC .................. *C08K 3/30* (2013.01); *C08K 3/22* (2013.01); *C08K 3/36* (2013.01); *C09D 127/12* (2013.01); *C09D 127/18* (2013.01); *C09D 163/00* (2013.01); *H01B 1/023* (2013.01); *H01B 1/026* (2013.01); *H01B 3/308* (2013.01); *H01B 3/40* (2013.01); *H01B 3/445* (2013.01); *C08K 9/06* (2013.01); *C08K 2003/2296* (2013.01); *C08K 2003/3009* (2013.01); *C08L 2205/025* (2013.01); *C08L 2205/03* (2013.01)

(58) Field of Classification Search
CPC ... C08K 3/30; C08K 3/36; C08K 9/06; C08K 2003/2296; C08K 2003/3009; H01B 1/023; H01B 181/026; H01B 3/40; C09D 127/18; C09D 127/12; C09D 163/00; C09D 7/61; C09D 127/20; H01L 33/445; C08L 2205/03; C08L 2205/025
See application file for complete search history.

(56) References Cited

U.S. PATENT DOCUMENTS 3,248,251 A 4/1966 Allen
3,464,854 A 9/1969 Bolger
(Continued)

FOREIGN PATENT DOCUMENTS

BR PI0802480 A2 3/2010
CA 2380793 A1 10/2002
(Continued)

OTHER PUBLICATIONS

Supplementary European Search Report, EP15811837, date of completion May 3, 2018, 12 pages.
(Continued)

*Primary Examiner* — Steven T Sawyer
(74) *Attorney, Agent, or Firm* — Alston & Bird LLP

(57) ABSTRACT

A coating composition for a substrate includes a polymer binder, one or more hydrophobic silicon dioxide compositions, and one or more UV protection agents. The polymer binder can include a fluoropolymer or an epoxy polymer resin. The coating composition can also include molybdenum disulfide.

7 Claims, 3 Drawing Sheets

Related U.S. Application Data

(60) Provisional application No. 62/015,771, filed on Jun. 23, 2014.

(51) Int. Cl.
    *H01B 1/02*     (2006.01)
    *H01B 3/30*     (2006.01)
    *H01B 3/40*     (2006.01)
    *C09D 127/18*   (2006.01)
    *C08K 3/22*     (2006.01)
    *C08K 3/36*     (2006.01)
    *C09D 163/00*   (2006.01)
    *H01B 3/44*     (2006.01)
    *C08K 9/06*     (2006.01)

(56) References Cited

U.S. PATENT DOCUMENTS

| | | |
|---|---|---|
| 3,844,729 A | 10/1974 | Sedlatschek et al. |
| 4,248,824 A | 2/1981 | Hattop |
| 4,553,417 A * | 11/1985 | Badger ............... B21B 45/0263 |
| | | 148/537 |
| 4,849,305 A | 7/1989 | Yanagisawa |
| 5,732,322 A | 3/1998 | Nakamaru et al. |
| 5,789,701 A * | 8/1998 | Wettengel ............ G02B 6/4422 |
| | | 174/40 R |
| 5,900,281 A * | 5/1999 | Deogan ................. C09D 5/185 |
| | | 427/393.3 |
| 5,900,318 A | 5/1999 | Yanagisawa |
| 6,319,604 B1 | 11/2001 | Xu |
| 7,247,266 B2 | 7/2007 | Bolcar |
| 7,411,129 B2 | 8/2008 | Kummer et al. |
| 7,638,709 B2 | 12/2009 | Kenny et al. |
| 8,034,865 B2 | 10/2011 | Hamel et al. |
| 8,227,534 B2 | 7/2012 | Chasey |
| 8,322,754 B2 | 12/2012 | Carcagno et al. |
| 8,658,576 B1 | 2/2014 | Bigbee, Jr. et al. |
| 8,883,917 B1 | 11/2014 | Davies et al. |
| 9,012,781 B2 | 4/2015 | Daniel et al. |
| 9,067,821 B2 | 6/2015 | Bleecher et al. |
| 9,096,786 B2 | 8/2015 | Sikka et al. |
| 9,328,245 B2 | 5/2016 | Siripurapu et al. |
| 9,352,371 B1 | 5/2016 | Bigbee et al. |
| 9,493,615 B2 | 11/2016 | Backer et al. |
| 9,587,201 B2 | 3/2017 | Tomsheck et al. |
| 9,647,303 B2 | 5/2017 | Jin et al. |
| 9,728,299 B2 | 8/2017 | Cade et al. |
| 2003/0017124 A1 | 1/2003 | Agostini et al. |
| 2003/0064232 A1 | 4/2003 | Allen |
| 2003/0159764 A1 | 8/2003 | Goto |
| 2003/0162033 A1 | 8/2003 | Johnson |
| 2004/0029748 A1 | 2/2004 | Levy |
| 2004/0175407 A1 | 9/2004 | McDaniel |
| 2004/0259836 A1 | 12/2004 | Twydell |
| 2006/0029808 A1 | 2/2006 | Zhai et al. |
| 2006/0292345 A1 | 12/2006 | Dave et al. |
| 2007/0065067 A1 | 3/2007 | Gartner et al. |
| 2007/0134488 A1 * | 6/2007 | Hayakawa ............... C09D 7/61 |
| | | 428/323 |
| 2008/0129044 A1 | 6/2008 | Carcagno et al. |
| 2008/0159671 A1 | 7/2008 | Leonardelli |
| 2008/0240479 A1 | 10/2008 | Linford et al. |
| 2008/0286556 A1 | 11/2008 | D'urso et al. |
| 2009/0076430 A1 | 3/2009 | Simpson et al. |
| 2009/0275685 A1 | 11/2009 | Hamel et al. |
| 2009/0311476 A1 | 12/2009 | Stetina et al. |
| 2009/0317553 A1 * | 12/2009 | Harvey ................. C08L 27/18 |
| | | 427/385.5 |
| 2010/0098956 A1 | 4/2010 | Sepeur et al. |
| 2010/0101828 A1 | 4/2010 | Duarte Pena et al. |
| 2010/0102693 A1 | 4/2010 | Driver et al. |
| 2010/0275815 A1 | 11/2010 | Dave |
| 2010/0310774 A1 * | 12/2010 | Wu ........................ C09D 7/62 |
| | | 427/331 |
| 2010/0314575 A1 | 12/2010 | Gao et al. |
| 2011/0034590 A1 | 2/2011 | Kuhn |
| 2011/0110992 A1 | 5/2011 | Garrison |
| 2011/0149528 A1 | 6/2011 | Nelson |
| 2012/0172493 A1 | 7/2012 | Dettloff |
| 2013/0045387 A1 * | 2/2013 | Chu ................. H01L 31/02168 |
| | | 428/410 |
| 2013/0115380 A1 * | 5/2013 | Zhang ................... B05D 5/083 |
| | | 427/485 |
| 2013/0153261 A1 | 6/2013 | Bremser et al. |
| 2013/0264090 A1 | 10/2013 | Cade et al. |
| 2013/0264093 A1 | 10/2013 | Fontana et al. |
| 2014/0041925 A1 | 2/2014 | Davis et al. |
| 2014/0308455 A1 | 10/2014 | Bordet et al. |
| 2015/0087797 A1 * | 3/2015 | Doyle .................... C08G 18/10 |
| | | 528/64 |
| 2015/0104641 A1 | 4/2015 | Mhetar et al. |
| 2015/0194240 A1 | 7/2015 | Ranganathan et al. |
| 2015/0344748 A1 | 12/2015 | Wohl |
| 2016/0130520 A1 | 5/2016 | Kong et al. |
| 2017/0145580 A1 | 5/2017 | Dolan et al. |

FOREIGN PATENT DOCUMENTS

| | | |
|---|---|---|
| CA | 2471318 A1 | 12/2004 |
| CA | 2862012 A1 | 12/2013 |
| CN | 1394240 A | 1/2003 |
| CN | 1450139 A | 10/2003 |
| CN | 1509386 A | 6/2004 |
| CN | 1562623 A | 1/2005 |
| CN | 1826221 A | 8/2006 |
| CN | 101585999 A | 11/2009 |
| CN | 101691473 A | 4/2010 |
| CN | 101838576 A | 9/2010 |
| CN | 102676048 A | 9/2012 |
| CN | 103275357 A | 9/2013 |
| CN | 103275396 A | 9/2013 |
| CN | 103426556 A | 12/2013 |
| CN | 105419180 A | 3/2016 |
| CN | 105602178 A | 5/2016 |
| CN | 105694436 A | 6/2016 |
| CN | 105957592 A | 9/2016 |
| CN | 106893162 A | 6/2017 |
| DE | 102005059614 A1 | 6/2007 |
| EP | 0189927 A2 | 8/1986 |
| EP | 0537360 A1 | 4/1993 |
| EP | 0945253 A2 | 9/1999 |
| EP | 1764522 A2 | 3/2007 |
| EP | 2565243 A1 | 3/2013 |
| EP | 2842970 A1 | 3/2015 |
| FR | 2971617 A1 | 8/2012 |
| JP | S6273422 A | 4/1987 |
| JP | H0718322 A | 7/1995 |
| JP | H1110140 A | 1/1999 |
| JP | 2010280887 A | 12/2010 |
| JP | 2011148107 A | 8/2011 |
| KR | 1020050079705 | 8/2005 |
| KR | 20070032248 A | 3/2007 |
| KR | 20080012242 A | 2/2008 |
| KR | 101086847 B1 | 11/2011 |
| RU | 2483377 C1 | 5/2013 |
| WO | 02084163 A1 | 10/2002 |
| WO | 2006063468 A1 | 6/2006 |
| WO | 2007045003 A1 | 4/2007 |
| WO | 2008125740 A1 | 10/2008 |
| WO | 2011095208 A1 | 8/2011 |
| WO | 2013161402 A1 | 10/2013 |

OTHER PUBLICATIONS

Supplementary Partial European Search Report, EP15811837, dated Feb. 5, 2018, 11 pages.
Canadian Office Action for FA 2953510, dated Aug. 1, 2018, 4 pages.
Korean Office Action for KR 10-2017-7000469, dated Jul. 20, 2018, 6 pages.
Office Action for counterpart Chinese Patent Application No. 201580043019.7, dated Dec. 19, 2017, 6 pages.

(56) References Cited

OTHER PUBLICATIONS

Office Action for counterpart Japanese Patent Application No. 2016-575029, dated Feb. 27, 2018, 7 pages.
Office Action for counterpart Canadian Patent Application No. 2953510, dated Nov. 22, 2017, 4 pages.
International Search Report and Written Opinion in counterpart international Application No. PCT/US15/36840, dated Oct. 7, 2015.
Xiu et al., "UV and Thermally Stable Superhydrophobic Coatings from Sol-Gel Processing", Journal of Colloid and Interface Science, vol. 326, No. 2, 2008, pp. 465-470 doi:10.1016/j.jcis.2008.06.042.
Dow Plastics, "Epoxy Novolac Resins: High Temperature, High Performance Expoxy Resins", The Dow Chemical Company, Oct. 1998, p. 12.
Newport, "Oriel Product Training: Solar Stimulation", Oct. 30, 2013, http://assets.newport.com/webDocuments-EN/images/12298.pdf, figure 25.
European Examination Report for European Patent Application No. 15811837.2, dated Mar. 30, 2020, (6 pages), European Patent Office, The Netherlands.

\* cited by examiner

UV-RESISTANT SUPERHYDROPHOBIC COATING COMPOSITIONS

CROSS-REFERENCE TO RELATED APPLICATION

This application is a continuation of U.S. patent application Ser. No. 14/745,384, filed Jun. 20, 2015, which claims priority to U.S. Provisional Patent Application No. 62/015,771, filed Jun. 23, 2014, entitled "UV-Resistant Superhydrophobic Coating Compositions," the entire disclosure of which is incorporated herein by reference.

FIELD

The present invention relates to coatings for substrates such as conductors, including bare overhead conductors for overhead power transmission lines and bare grounding wires.

BACKGROUND

Overhead power transmission lines provide electrical power transmission and distribution over great distances. The power transmission lines are typically supported via towers and/or poles so as to be suspended at a safe distance from the ground so as to prevent dangerous contact with an energized line during power transmission operations.

It is desirable to provide an adequate coating for substrates, such as conductors, that is resistant to accumulation of ice, effective in repelling water, self-cleaning, as well as resistant to wear from the outside environment (for example, due to UV exposure as well as exposure to acid rain and other pollutants).

SUMMARY

A coating composition comprises a polymer binder, one or more hydrophobic silicon dioxide compositions, and one or more UV protection agents. The polymer binder can include a fluoropolymer or an epoxy polymer resin. In one example embodiment, the polymer binder comprises one or more fluoropolymers. In another example embodiment, the polymer binder comprises one or more epoxy polymer resins. In still a further example embodiment, the polymer binder comprises a mixture of one or more fluoropolymers and one or more epoxy polymer resins. In an embodiment, the coating composition can also include molybdenum disulfide. The coating composition is applied to a substrate surface, such as the exterior surface of a bare overhead conductor.

These and/or other features, aspects, and advantages of the present invention will become better understood when the following detailed description is read with reference to the accompanying drawings in which like characters represent like parts throughout the drawings.

DETAILED DESCRIPTION

Figure 1:
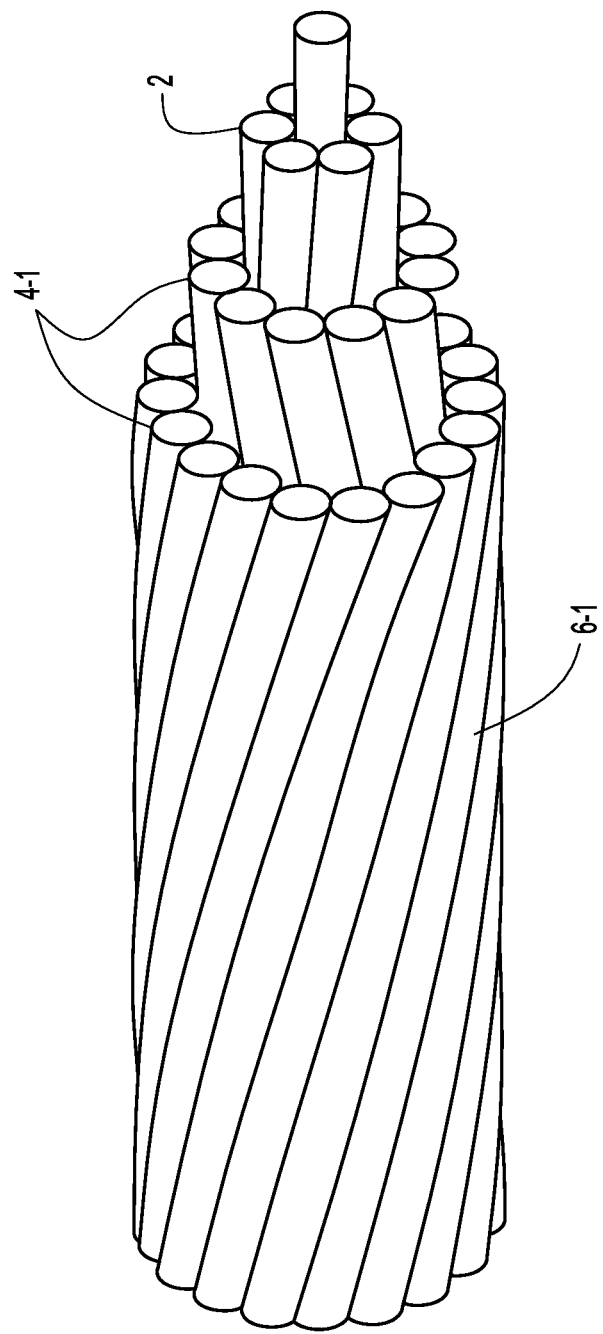
FIG. 1 depicts a side view in partial cross section depicting an aluminum conductor steel supported (ACSS) round wire (RW) conductor cable to which a coating as described herein is applied.

As described herein, UV-resistant superhydrophobic coatings for conductors are formed from novel compositions having heat and chemical resistant properties, being permeation resistant, and having a sufficient hardness and toughness while also a suitable flexibility and are suitably lightweight. The coating compositions can also be imparted with abrasion resistant properties. The coating compositions can comprise a hydrophobic polymer binder, one or more hydrophobic silica compositions, a friction reducing agent and/or one or more UV protection agents. As described herein, the coating compositions can be applied to a substrate surface via any suitable technique, such as a wet technique (for example, spray coating, brushing, rolling or any other suitable wet application) and a dry technique (for example, a dry powder coating).

The coating compositions are particularly suitable for electrical transmission cables for the overhead transmission of electricity, such as bare overhead conductors typically used in power transmission lines (i.e., overhead power lines suspended above ground). Examples of types of bare overhead conductors to which the coating compositions of the present invention can be applied include, without limitation, aluminum conductor steel supported (ACSS) cables, aluminum conductor steel reinforced (ACSR) cables, aluminum conductor steel supported (ACSS) cables, aluminum conductor composite reinforced (ACCR) cables, and aluminum conductor composite core (ACCC) cables, each of which may include electrical strands or wires of the round wire (RW) type, trap wire (TW) type and/or any other suitable conductor types. For example, the coating compositions can be provided for bare overhead conductor types including, without limitation, ACSS/AW conductors, ACSR/TW conductors, ACSR/TW conductors, ACSR/AW conductors, AAC conductors, AAC/TW conductors, ACAR conductors, AAAC conductors, Motion-Resistant conductors, as well as other types of conductors including, without limitation conductors commercially available under the trade names VR2®, HS285 and C$^7$ from Southwire Company (Georgia USA).

The conductors can include any one or combinations of aluminum, aluminum alloys, copper, copper alloys, steel, steel alloys, polymer composites (e.g., a carbon fiber polymer composite core that comprises carbon fibers embedded within a polymer matrix, such as a thermoplastic polymer matrix, where the carbon fiber polymer composite core may be of the types described in U.S. Pat. No. 9,012,781, the disclosure of which is incorporated herein by reference in its entirety) and/or any other suitable types of conductive or non-conductive materials making up the conductor core and/or any other portions of the conductor. It is further noted that the coating compositions can also be applied to any other substrates to provide superhydrophobicity and UV protection for such substrates. The conductors can include a core member that can comprise one or more electrically conductive strands or wires that extend the length of the conductors, where the conductive wires can be arranged in any suitable configurations or arrays along a central axis of the conductors. For example, a conductor can include a core member that comprises one or more layers of wires, where the wires in each layer are arranged in any suitable manner (e.g., twisted with each other, wrapped together in the layer with each other, etc.). The core member can further include a single central strand or wire at the center of the core member with one or more layers of wires extending around the central wire. Further still, the core member can include a core cable or strand (which may be conductive or non-conductive) and one or more electrically conductive strands or wires extending around the core cable or strand. The conductive wires and/or core cable or strand can have any suitable dimensions, including wires having cross-sectional dimensions (i.e., a dimensions transverse the length of the wires, such as diameters for wires having circular cross-sections) that are from about 1 mm or smaller to about 5 cm or greater. The outer transverse cross-section (e.g., outer diameter) of a conductor can also vary considerably based upon a particular application, where some conductors can have diameters of about 5 cm or smaller to about 30 cm or greater.

Figure 2:
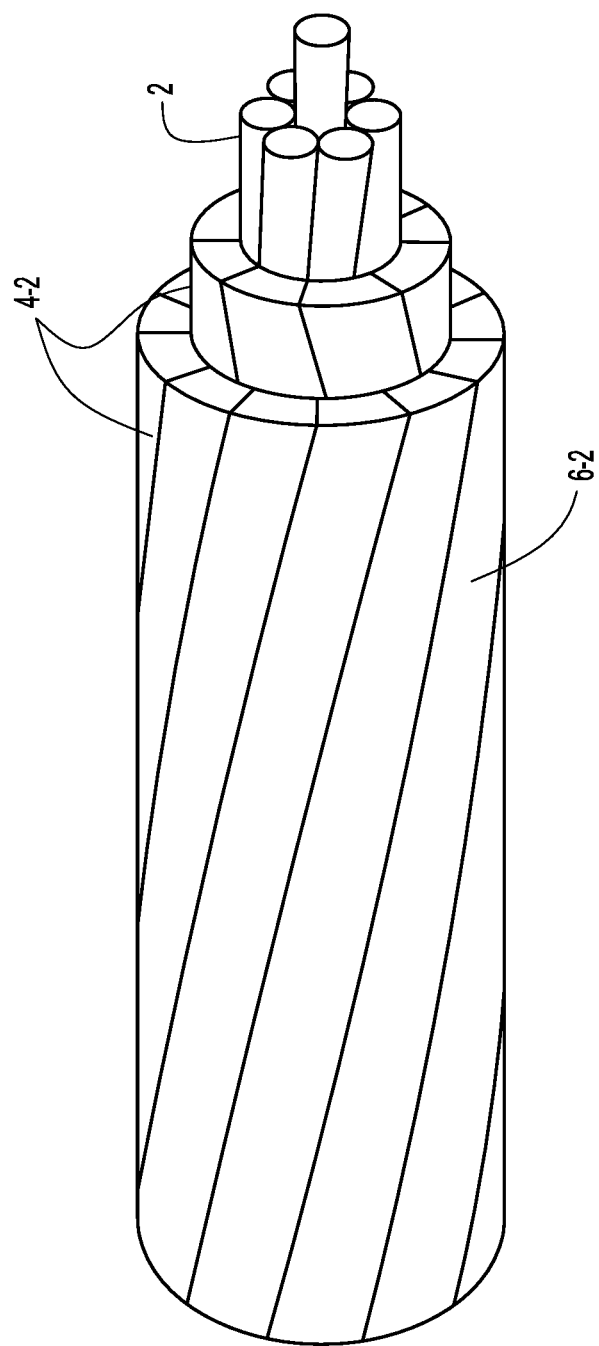
FIG. 2 depicts a side view in partial cross section depicting an aluminum conductor steel supported (ACSS) trap wire (TW) conductor cable to which a coating as described herein is applied.

An example embodiment of an ACSS RW cable is depicted in FIG. 1, while an example embodiment of an ACSS TW cable is depicted in FIG. 2. In each embodiment, the ACSS cable includes concentrically aligned or layered strands or wires with a central or core portion 2 of the cable including steel wires and two or more layers of aluminum wires 4 circumferentially aligned around the core portion of steel wires (for example, the aluminum wires can have a 1350-0 (fully annealed to soft) temper. The aluminum wires 4-1 have a circular or round configuration as shown for the ACSS RW cable type depicted in FIG. 1, while at least some of the aluminum wires 4-2 have a generally trapezoidal shape for the ACSS TW cable type depicted in FIG. 2. The steel and aluminum wires within the cables can be coated with an alloy or any other suitable coating to prevent corrosion and provide other protection for the wires as well as enhance power transmission capabilities within the cables. In addition, the wires within the cables can comprise pure aluminum, one or more aluminum alloys, copper and/or other suitable electrically conducting materials to enhance power transmission capabilities. The core wires can comprise steel, coated steel, aluminum, aluminum alloys, and/or other composite materials. The coating composition can further be applied to the outer most layer and/or to one or more of the individual wires of the conductor. The conductor can be a solid single conductor (for example a bare grounding wire, such as a bare grounding copper wire) or multi-stranded conductor. The stranded conductor can comprise a single layer of wires or multiple layers of wires. Specific ACSS RW and ACSS TW cable types are commercially available from, for example, Southwire Company (Georgia USA). The ACSS cables are designed for use in overhead power distribution lines, where such cables are configured to operate continuously at elevated temperatures of up to about 250° C. without loss of strength. It is further noted that these cable types are provided for purposes of illustration only, and the coatings described herein are not limited to implementation with only these cable types but instead can be used to coat any other types of bare overhead conductors as well as other types of conductors.

The conductor coating compositions comprise a polymeric base or binder, such as a hydrophobic polymer base or binder. Preferably types of polymeric binders suitable for forming coating compositions in accordance with the present invention include thermoplastic fluoropolymers and thermosetting polymer resins (such as epoxy polymer resins). For example, the polymer binder can comprise one or more fluoropolymers, the polymer binder can comprise one or more epoxy polymer resins, or the polymer binder can comprise a mixture of one or more fluoropolymers and one or more epoxy polymer resins.

The polymer binder material should be suitably stable at a wide range of temperatures, depending upon different applications for use of the coating compositions. For example, coating compositions for conductors need to have a sufficiently high thermal stability or rating in order to withstand elevated temperatures of the conductor member (e.g., due to the electrical load or current running through the conductor member). The onset or softening of the polymer binder material, also referred to as its glass transition temperature ($T_g$) and/or the melting temperature ($T_m$) of the polymer binder (i.e., the temperature point at which the polymer changes from solid to liquid) must be great enough to withstand heat dissipated from the internal conductor member. Suitable $T_g$ or $T_m$ values for polymer binder materials comprising fluoropolymers and/or epoxy polymer resins can be from about 75° C. to about 350° C., such as from about 100° C. to about 300° C., from about 150° C. to about 280° C. and/or from about 200° C. to about 250° C.

The polymer binder comprises a major portion (i.e., 50% or greater by weight of the coating composition) of the coating compositions. In particular, the polymer binder can comprise at least about 60% by weight of the coating composition, at least about 70% by weight of the coating composition, at least about 80% by weight of the coating composition, or at least about 90% by weight of the coating composition.

Some non-limiting examples of suitable types of thermoplastic fluoropolymer binders for implementation as part of the coating compositions include polytetrafluoroethylene (PTFE), polyvinylidene difluoride (PVDF), polyhexafluoropropylene (PHFP), and combinations thereof (for example, one or any combination of PTFE, PVDF and PHFP). Some specific examples of fluoropolymers suitable for forming binders of the coating compositions of the present invention and which include one or more of PTFE, PVDF and PHFP are commercially available under the trade names DYNEON THV 500G (3M Corporation), DYNEON FEP 6322 (3M Corporation), Dupont FEP 9494 (DuPont Corporation), and Dupont FEP 106 (Dupont Corporation). The DYNEON THV fluoropolymer composition comprises PTFE, PVDF and PHFP, while the FEP fluoropolymer compositions comprise PTFE and PHFP. In an example embodiment, the fluoropolymer binder includes THV fluoropolymers (PTFE, PVDF and PHFP) in an amount of about 0% to about 70% by weight of the binder and FEP fluoropolymers (PTFE and PHFP) in an amount of about 30% to about 90% by weight of the binder. In another example embodiment, the fluoropolymer binder is made up entirely or almost entirely of FEP fluoropolymers (PTFE and PHFP).

Some non-limiting examples of suitable types of thermosetting polymer resins for implementation as part of the coating compositions are epoxy polymer resins such as glycidyl epoxy polymer resins and non-glycidyl epoxy polymer resins. Glycidyl epoxy polymer resins can be prepared via a condensation reaction of a suitable dihydroxy compound, dibasic acid or a diamine with epichlorohydrin, while non-glycidyl epoxy polymer resins can be formed by peroxidation of an olefinic double bond in a suitable polymer compound. Glycidyl epoxy polymer resins can include glycidyl-amine polymer combinations, glycidyl-ester polymer combinations and glycidyl-ether polymer combinations. Some specific examples of glycidyl epoxy polymer resins include, without limitation, bisphenol A epoxy resins, bisphenol F epoxy resins, bisphenol S epoxy resins, and novolac (phenol-formaldehyde) epoxy resins. Non-glycidyl epoxy polymer resins can include aliphatic polymers and/or cycloaliphatic polymers. Suitable thermosetting epoxy polymer resins for use in forming coating compositions can include any one or more types of glycidyl epoxy polymers, any one or more types of non-glycidyl epoxy polymers, and any one or more combinations of glycidyl and non-glycidyl epoxy polymers, where the epoxy polymer resins can further include any number of suitable functional groups (e.g., aliphatic and aromatic groups) forming part of the chemical structure of the epoxy polymer resins.

The selection of one or more particular thermosetting epoxy polymer resins for use as some or all of the polymer binder of the coating composition will depend upon a particular application of use for the coating composition. Epoxy polymer resins can be selected that are single or one-part epoxy resins (i.e., resin only) or two-part epoxy resins (i.e., resin with a further additive such as a catalyst or a hardener), where the curing of the epoxy polymer resin can be at any desired temperature, including ambient temperature (e.g., from about 20° C. to about 27° C.) or any elevated temperature (e.g., curing temperatures as high as about 280° C.). Epoxy polymer resins can also be selected for use as some or all of the polymer binder of the coating composition that are cured via a radiation curing (e.g., ultraviolet or UV curing) process, in which the curing process is initiated to cure the epoxy polymer resin by subjecting the epoxy polymer resin to irradiation (e.g., UV radiation).

Any suitable one or more types of solvents may be utilized to provide the epoxy polymer resin in a liquid state for application to a surface to be coated (i.e., prior to curing). Alternatively, the epoxy polymer resin can be substantially free of any solvent or solvent-free (e.g., no greater than about 5% by weight, such as no greater than 1% by weight, of any solvent combined with the epoxy polymer resin to form the polymer binder).

Choosing one or more particular solvents and/or one or more types of particular epoxy polymer resin compounds can be based upon a particular viscosity of the epoxy polymer resin material desired for application to a surface to be coated. In particular, a wide range of viscosities and/or thermosetting or curing temperature profiles (i.e., temperature vs. time) can be obtained based upon choosing one or a combination of specific epoxy polymer resins (e.g., based upon a specific epoxy chemical family, a specific polymer structure and/or one or more specific polymer functional groups attached with epoxy polymer) and/or one or more solvents combined with such epoxy polymer resins, such that a desired viscosity and/or curing temperature profile can be obtained based upon a particular application in which the coating composition is to be applied to a substrate surface. The curing of the one or more epoxy polymer resins (which includes polymerization reactions of polymer functional groups resulting in a certain degree of crosslinking and increase in viscosity) to achieve a thermoset or cured structure can be adjusted based upon the selection of epoxy polymer resin type(s). In particular, epoxy polymer resin type(s) can be selected such that the coating composition is thermoset or cured at any suitable temperature and cure time based upon a particular application. For example, for some applications it may be desirable to achieve curing of the epoxy polymer resin within the coating composition at a lower (e.g., ambient) temperature, while for other applications it may be desirable to achieve curing at an elevated or higher temperature. Typically, curing of an epoxy polymer resin at an elevated temperature will correspond with a faster cure time (i.e., an accelerated curing process).

In addition, the selection of one or a combination (e.g., a blend) of epoxy polymer resin compounds can be selected based upon desired properties for the resultant coating compositions, such as mechanical properties, high thermal integrity (e.g., able to withstand sufficiently high temperatures without degradation), corrosion resistance in outdoor or other harsh (e.g., extreme upper and/or lower temperature) environments, etc., for a particular application (e.g., for coating overhead power transmission lines as described herein).

Given the variety of different types of epoxy polymer resins and varying chemical and mechanical properties associated with the varying types, one or more particular types of epoxy polymer resins can be selected for forming the polymer binder of the coating compositions so as to impart desired properties such as curing profile, thermal stability and corrosion resistance for the coating compositions (particular for coating compositions for use on surfaces subjected to exposure within harsh outside environments).

Epoxy polymer resins can be provided in a liquid state (i.e., prior to curing), e.g., via combining with one or more solvents, so as to facilitate ease of mixing or combining with other additives or components to form the coating compositions (e.g., combining with hydrophobic silicon dioxide compositions, a friction reducing agent such as molybdenum disulfide and/or UV protection agents) so as to achieve a substantially homogeneous dispersion of the other components within the liquid epoxy polymer resins prior to coating and curing on a substrate surface. Further, the coating compositions comprising one or more epoxy polymer resins in liquid state can be applied to a substrate surface in any suitable manner including, without limitation, via a roller, via a brush, via a suitable spraying technique (e.g., via a spray gun), via dipping or submersion of the substrate surface within a bath or reservoir containing the coating compositions, etc.

Some examples of suitable epoxy polymer resins that can be used as polymer binders within coating compositions as described herein include epoxy polymer resins having a viscosity at an ambient temperature (e.g., from about 20° C. to about 27° C.) and prior to initiation (and/or at the initial onset) of curing in the range from about 1 centipoise (cP) to about 25,000 cP, such as from about 50 cP to about 15,000 cP, or from about 100 cP to about 11,000 cP, and further still from about 200 cP to about 6,000 cP.

Other examples of suitable epoxy polymer resins that can be used as polymer binders within coating compositions as described herein include epoxy polymer resins having curing schedules as follows: a curing time (e.g., a time from initial onset of curing at an initial viscosity of the epoxy polymer resin to a final cured or thermoset state at a final viscosity of the epoxy polymer resin that is greater than the initial viscosity) from about 5 hours to about 2 weeks, such as from about 12 hours to about 1 week and/or from about 24 hours to about 48 hours, at a curing temperature (e.g., a temperature at which activation of the curing process for the epoxy polymer resin occurs) that is ambient (e.g., from about 20° C. to about 27° C.); a curing time of no greater than about 4 hours at a curing temperature in the range from about 200° C. to about 280° C. (e.g., a temperature of about 250° C.); a curing time of no greater than about 1 hour at a curing temperature from about 200° C. to about 280° C. (e.g., a temperature of about 250° C.); and a curing time of no greater than about 30 minutes (e.g., 20 minutes or less) at a curing temperature from about 200° C. to about 280° C. (e.g., a temperature of about 250° C.).

Some specific examples of thermosetting epoxy polymer resins that can be used as polymer binders within coating compositions as described herein include, without limitation: two part epoxy polymer resins commercially available under the trade names Resolcoat GC-HT210, Resolcoat GC-HT180, Resolcoat HTG 240, Resolcoat HTG 210 and Resolcoat HTG 180 (Resoltech, France); single or one-part epoxy polymer resins commercially available under the trade names Supreme 10HT, Supreme 3HT-80, and Supreme EP17HT-LO and a two-part epoxy polymer resin commercially available under the trade name Supreme 45HTQ (Masterbond, Inc., New Jersey, USA); two-part epoxy polymer resins commercially available under the trade names Hysol® 9340 and E-90FL™ (Loctite Corporation, Connecticut, USA); single or one-part epoxy polymer resins commercially available under the trade names Duralco™ 4538, Duralco™ 4525 and Duralco™ 4461 (Cotronics Corporation, New York, USA); and single or one-part epoxy polymer resins commercially available under the trade names BONDiT™ B-46, BONDiT™ B-45, BONDiT™ B-482, BONDiT™ B481 and BONDiT™ B-4811 (Reltek LLC, California, USA).

The polymer binders described herein (i.e., fluoropolymers and/or epoxy polymer resins) can be selected to be hydrophobic and thus water repellant. The hydrophobicity of coatings formed utilizing such polymer binders can be described in relation to a contact angle of a water droplet formed on a surface of the coating. In particular, a water droplet formed on a coating of the present invention has a contact angle of greater than 90°. The greater the degree of the contact angle of a water droplet formed on the coating surface correlates with a greater degree of hydrophobicity (i.e., more hydrophobic). The polymer binders can be formed utilizing one or more fluoropolymers, one or more epoxy polymer resins and/or combinations of one or more fluoropolymers with one or more epoxy polymer resins, where a particular polymer binder can be utilized that results in desired properties for the coating composition including a desired hydrophobicity (e.g., as defined by contact angle of a water droplet formed on a surface of the coating composition applied to a substrate).

In addition to the selection of a suitable polymer binder that includes one or a combination of fluoropolymers and/or one or a combination of epoxy polymer resins, hydrophobicity of the coating composition can be enhanced (i.e., contact angle of water droplet on coating surface is increased) by providing within the coating compositions hydrophobic silicon dioxide or silica (hydrophobic $SiO_2$), in particular hydrophobic fumed or pyrogenic silica. The hydrophobic $SiO_2$ can be provided in an amount of no greater than about 15% by weight of the coating composition, for example in an amount from about 0.5% to about 15% by weight of the coating composition, or an amount from about 0.5% to about 9% by weight of the coating composition.

As used herein, the term "hydrophobic silica" or "hydrophobic silica composition" refers to silica (i.e., silicon dioxide) that has been treated with organic surfactants and/or polymers so as to bond hydrophobic functional groups to silica thus yielding a composition having a degree of hydrophobicity that is greater (i.e., more hydrophobic) in relation to silica prior to treatment. For example, silica can be hydrophobized to include any one or more functional polymer groups including, without limitation, alkyl, alkoxy, silyl, alkoxysilyl, siloxy, bonded to the surface of the silica to obtain a hydrophobic fumed or pyrogenic silica. The hydrophobic silica can also be formed from fumed or pyrogenic silica, which is silica produced via flame pyrolysis of, e.g., silicon tetrachloride or quartz sand. Fumed or pyrogenic silica comprises amorphous silica that is fused into branched particles resulting in a powder having low bulk density and high surface area. In example embodiments, the hydrophobic silica can have a BET (Brunauer, Emmett and Teller) surface area from about 80 $m^2$/g to about 300 $m^2$/g. In other example embodiments, the hydrophobic silica can have a carbon content greater than zero (where a carbon content of zero represents silica that has not been treated with carbon-containing polymers), such as a carbon content of at least about 0.5% by weight, a carbon content of at least about 1.0% by weight, or a carbon content of at least about 1.5% by weight. For example, the hydrophobic silica can have a carbon content from about 0.5% by weight to about 7.0% by weight.

Some specific examples of polymer functional groups suitable for bonding with silica (and/or fumed or pyrogenic silica) to form a hydrophobic silica for use in coating compositions as described herein include methyl chlorosilanes, hexamethyldisilazane (HMDS), polydimethylsiloxane (PDMS), octylsilane, hexadecylsilane, methacrylsilane, dimethyldichlorosilane (DDS), and octamethylcyclotetrasiloxane. Selection of one or more specific types of hydrophobic silica, each of which includes specific functional groups, to add to the coating compositions will control the amount or degree at which hydrophobicity of the coating compositions can be modified. In other words, the hydrophobicity of the coating compositions can be precisely modified or "fine tuned" based upon the selection of one or more specific types of hydrophobic silica compositions, as well as the amount, to add to the coating compositions.

Some non-limiting specific examples of various grades of one or more suitable hydrophobic silica compositions that can be added to the coating compositions of the present invention are: hydrophobic silica compositions having HMDS, PDMS, octylsilane, hexadecylsilane, methacrylsilane, DDS or octamethylcyclotetrasiloxane as a functional group and commercially available under the trade names AEROSIL R 104, AEROSIL R 106, AEROSIL R 202, AEROSIL R 208, AEROSIL R 504, AEROSIL R 711, AEROSIL R 805, AEROSIL R 812, AEROSIL R 812S, AEROSIL R 972, AEROSIL R 974, AEROSIL R816 AEROSIL R 7200 and AEROSIL R 8200 (Evonik Industries AG, Germany); hydrophobic silica compositions having methyl chlorosilanes or HMDS as a functional group and commercially available under the trade names HDK H13L, HDK H15, HDK H17, HDK H18, HDK H20, HDK H30 and HDK H2000 (Wacker Chemie AG, Germany); and hydrophobic silica compositions having HMDS, DDS or PDMS as a functional group and commercially available under the trade names CAB-O-SIL TS-530, CAB-O-SIL TS-610, CAB-O-SIL TS-622 and CAB-O-SIL TS-720 (Cabot Corporation, Georgia, USA).

Providing one or more hydrophobic silica compositions within the coating composition results in an increase in the contact angle for a water droplet formed on the composition coated on a substrate surface to 130° or greater (for example, at least about 140°, at least about 150°, at least about 160° or even greater), thus rendering the coating composition superhydrophobic.

The coating compositions can further be enhanced by providing a friction reducing agent such as molybdenum disulfide ($MoS_2$). The friction reducing agent lowers the coefficient of friction of the coating composition so as to render the coating compositions more durable and resistant to wear caused by abrasion on the coating surface. For example, in embodiments in which the coating compositions are applied to conductor surfaces, the friction reducing agent added to the coating compositions minimizes damage to the coating during installation of the conductors. The friction reducing agent can be provided in an amount from about 0.1% to about 15% by weight of the coating composition (for example, from about 0.1% to about 10% by weight of the coating composition, or from about 5% to about 10% by weight of the coating composition). Some non-limiting examples of suitable friction reducing agents in the form of molybdenum disulfide that can be added to the coating compositions of the present invention are a product commercially available under the trade name MCLUBE (McGee Industries) and $MoS_2$ products commercially available from Noah Technologies Corporation (Texas USA).

At least one UV protection agent, such as zinc oxide (ZnO) or titanium dioxide ($TiO_2$) can also be provided in the coating compositions to provide enhanced UV protection and wear resistance against sunlight and other external environment elements, such that the coating composition maintains or substantially maintains its hydrophobic properties even after long periods of exposure to UV radiation. The one or more UV protection agents can be provided in an amount of about 0.1% to about 10% by weight of the coating composition, such as from about 0.1% to about 6% by weight of the coating composition. Some non-limiting examples of zinc oxide products that can be provided in the coating compositions are commercially available under the trade names ZANO (Umicore Zinc Chemicals) and Z-COTE (BASF Corporation).

Coating compositions can be formed by mixing the components as described herein (polymer binder, one or more hydrophobic silica compositions, one or more UV protection agents and/or friction reducing agent) in any suitable manner with a suitable carrier solution (e.g., isopropyl alcohol) or any other suitable organic solution/solvent that adequately disperses (e.g., facilitates a homogeneous dispersion of components) and/or dissolves the components within solution. The mixture can then be applied to the conductor (or any other suitable) surface utilizing any suitable application technique (e.g., spray coating, application via a roller or brush, immersion of the substrate surface in the solution mixture, etc.).

When utilizing a fluoropolymer binder, the applied coating is then sufficiently dried to remove the liquid carrier thus resulting in a dry powder coating being adhered to the surface. After drying, the substrate is baked at a suitable temperature close to or above the melting point of the fluoropolymer binder for a suitable time period to allow the composition to flow and adhere properly to the substrate surface upon cooling, thus obtaining the resultant coating composition on the substrate. When utilizing an epoxy polymer resin, the applied coating is cured at a suitable curing temperature and for a sufficient time period to thermoset the epoxy polymer. When utilizing a combination of one or more fluoropolymers and one or more epoxy polymer resins for the polymer binder, and suitable combination of drying and/or heating may be applied to achieve suitable curing of the epoxy polymer component(s) within the binder as well as suitable flow, solidification and adherence of the fluoropolymer component(s) within the binder.

Some non-limiting examples of forming coating compositions in accordance with the present invention are described in Examples 1-5. In particular, Examples 1-4 describe the formation of coating compositions that include polymer binders comprising one or more fluoropolymers, where such coating compositions are further applied to a substrate surface. Example 5 describes the formation of coating compositions that include polymer binders comprising one or more epoxy polymer resins.

Example 1

Forty five grams of Dyneon THV 500G flouropolymer (3M Corporation) was combined with 45 grams of Dupont FEP 9494 flouropolymer (Dupont Corporation), 5 grams of AEROSIL R 8200 fumed silica (Evonik Industries AG), 5 grams McLube MOS2-98 molybdenum disulfide (McGee Industries) and 1 gram of Zano 20 zinc oxide (Umicore Zinc Chemicals) within 150 grams isopropyl alcohol carrier solution. The components were suitably mixed within solution to ensure a relatively homogeneous combination of the components existed in solution.

Aluminum plate samples were coated with the solution (for example, by spraying the coating to the surfaces of the plates), where the coating thickness on each plate was in the range from about 3 mil to about 8 mil. The surface coated plates were dried at ambient temperature (for example, about 25° C.) for at least 30 minutes followed by baking the plates in an air-circulated oven at a temperature of about 300° C. for about 10 minutes. The resultant coating composition adhered to the aluminum plate samples had the following composition:

TABLE 1

| | |
|---|---|
| Dyneon THV 500G (fluoropolymers) | 45 wt % |
| Dupont FEP 9494 (fluoropolymers) | 45 wt % |
| AEROSIL R 8200 (hydrophobic fumed silica) | 4 wt % |
| McLube MoS2-98 (molybdenum disulfide) | 5 wt % |
| Zano 20 (zinc oxide) | 1 wt % |

The contact angle for water droplets was measured for the coating compositions formed on the aluminum plates. The measured contact angles were at least about 140°, with some contact angles being greater than about 150° (e.g., as high as about 160° or greater).

Example 2

A composition was formed and applied to aluminum plates in a similar manner as described for Example 1, with the exception that certain components and weight compositions were modified such that the resultant coating composition was as follows:

TABLE 2

| | |
|---|---|
| Dyneon THV 500G (fluoropolymers) | 67 wt % |
| Dupont FEP 9494 (fluoropolymers) | 10 wt % |
| Dupont FEP 106 (fluoropolymers) | 10 wt % |
| AEROSIL R 812S (hydrophobic fumed silica) | 6 wt % |
| McLube MoS2-100 (molybdenum disulfide) | 4 wt % |
| Zano 20 Plus (zinc oxide) | 3 wt % |

Example 3

A composition was formed and applied to aluminum plates in a similar manner as described for Example 1, with the exception that certain components and weight compositions were modified such that the resultant coating composition was as follows:

TABLE 3

| | |
|---|---|
| Dupont FEP 106 (fluoropolymers) | 82 wt % |
| AEROSIL R 812S (hydrophobic fumed silica) | 5 wt % |
| AEROSIL R 8200 (hydrophobic fumed silica) | 3 wt % |
| McLube MoS2-99 (molybdenum disulfide) | 8 wt % |
| Z-cote HP1 (zinc oxide) | 2 wt % |

Example 4

Compositions were formed and applied to aluminum plates in a similar manner as described for Example 1, with the exception that certain components and weight compositions were modified such that the resultant coating compositions and average contact angle values measured were as follows:

TABLE 4

| | Composition A | Composition B | Composition C |
|---|---|---|---|
| Dupont FEP 6322 PZ (fluoropolymers) | 84.63 wt% | 86.45 wt% | 81.90 wt% |
| AEROSIL R812S (hydrophobic fumed silica) | 5.58 wt % | 5.70 wt % | 5.40 wt % |
| Zano 20 (zinc oxide) | 2.79 wt % | 2.85 wt % | 2.70 wt % |
| MOS2 99 (molybdenum disulfide) | 7.00 wt % | 5.00 wt % | 10.00 wt % |
| Average Contact Angle | 155.0 | 148.6 | 144.3 |

While the previous examples show the application of the coating compositions to aluminum surfaces, it is noted that the compositions can be applied to any metal or other (for example, organic) substrate surface, particularly substrate surfaces capable of withstanding drying temperatures (for example, 300° C.) that ensure sufficient melting of the fluoropolymer binder to form a homogeneous coating composition.

Example 5

A plurality of epoxy polymer resin based coating compositions (fifteen total) were prepared by combining the following epoxy polymer resins in liquid state with hydrophobic silica, zinc oxide and molybdenum disulfide in the following weight percentage ratios:

TABLE 5

| Compositions 1-3 | Composition 1 | Composition 2 | Composition 3 |
|---|---|---|---|
| Resolcoat GC-HT210 (2-part epoxy polymer binder) | 41.0 wt % | 57.0 wt % | 80.0 wt % |
| Resolcoat GC-HT180 (2-part epoxy polymer binder) | 41.0 wt % | 29.0 wt % | 10.0 wt % |
| Wacker HDK H13L (hydrophobic silica) | 4.5 wt % | 3.5 wt % | 2.5 wt % |
| BASF Z-COTE HP1 (zinc oxide) | 10.0 wt % | 8.0 wt % | 6.0 wt % |
| McLube MoS2-100 (molybdenum disulfide) | 3.5 wt % | 2.5 wt % | 1.5 wt % |
| Total | 100 wt % | 100 wt % | 100 wt % |
| Compositions 4-6 | Composition 4 | Composition 5 | Composition 6 |
| Masterbond Supreme 10HT (1-part epoxy polymer binder) | 78.0 wt % | 84.0 wt % | 89.0 wt % |
| Cabot CAB-O-SIL TS-610 (hydrophobic silica) | 7.0 wt % | 5.0 wt % | 3.0 wt % |
| BASF Z-COTE (zinc oxide) | 5.5 wt % | 4.0 wt % | 2.5 wt % |
| McLube MoS2-100 (molybdenum disulfide) | 9.5 wt % | 7.0 wt % | 5.5 wt % |
| Total | 100 wt % | 100 wt % | 100 wt % |
| Compositions 7-9 | Composition 7 | Composition 8 | Composition 9 |
| Loctite Hysol 9340 (2-part epoxy polymer binder) | 78.0 wt % | 83.0 wt % | 86.0 wt % |
| Wacker HDK H17 (hydrophobic silica) | 10.0 wt % | 9.0 wt % | 8.0 wt % |
| BASF Z-COTE HP1 (zinc oxide) | 8.0 wt % | 6.0 wt % | 4.5 wt % |
| McLube MoS2-100 (molybdenum disulfide) | 4.0 wt % | 2.0 wt % | 1.5 wt % |
| Total | 100 wt % | 100 wt % | 100 wt % |

TABLE 5-continued

| Compositions 10-12 | Composition 10 | Composition 11 | Composition 12 |
|---|---|---|---|
| Cotronics Duralco 4461 (1-part epoxy polymer binder) | 83.5 wt % | 83.5 wt % | 83.5 wt % |
| Cabot CAB-O-SIL TS-720 (hydrophobic silica) | 8.0 wt % | 7.0 wt % | 6.0 wt % |
| BASF Z-COTE (zinc oxide) | 5.0 wt % | 4.0 wt % | 3.0 wt % |
| McLube MoS2-99 (molybdenum disulfide) | 3.5 wt % | 5.5 wt % | 7.5 wt % |
| Total | 100 wt % | 100 wt % | 100 wt % |

| Compositions 13-15 | Composition 13 | Composition 14 | Composition 15 |
|---|---|---|---|
| Reltek BONDiT B-481 (1-part epoxy polymer binder) | 40.0 wt % | 54.0 wt % | 76.0 wt % |
| Reltek BONDiT B-46 (1-part epoxy polymer binder) | 40.0 wt % | 29.5 wt % | 12.0 wt % |
| Wacker HDK H20 (hydrophobic silica) | 6.0 wt % | 5.0 wt % | 4.0 wt % |
| BASF Z-COTE HP1 (zinc oxide) | 11.0 wt % | 9.0 wt % | 7.0 wt % |
| McLube MoS2-99 (molybdenum disulfide) | 3.0 wt % | 2.5 wt % | 1.0 wt % |
| Total | 100 wt % | 100 wt % | 100 wt % |

Each of the coating compositions of Example 5 including the one or more epoxy polymer binders can be coated on a substrate surface via any suitable application technique, such as using a brush or roller. After application, the coating compositions are cured at suitable curing profiles (i.e., suitable curing temperature and time), depending upon the specifications associated with the different types of epoxy polymer binders used.

The resultant coating compositions provide effective hydrophobicity for the substrate surfaces to which they are applied (e.g., a contact angle for a water droplet on the coated substrate surface is greater than 90°, typically at least about 140°).

Coating compositions as described herein can be applied to the exterior surface, or portions thereof, of conductors (for example, to a rounded or circular exterior surface) in the same manner as described herein in relation to Examples 1-4, where the coating composition can be formed in carrier solution and/or a solvent and then applied, for example, by spray coating, roller coating, brush coating or dipping of a conductor to coat exterior surface portions of the conductor followed by drying (for example air drying and/or heat drying) and/or curing for a suitable time period to result in the dried and/or thermoset or cured coating composition being adhered to the conductor surface.

In an alternative embodiment, a dry powder coating technique may be utilized to deposit the coating as a powder mixture of the components and then heating or baking the conductor (for example, at 300° C. for a sufficient time period, for example, about 10 minutes) to result in adhering of the coating composition to the conductor exterior surface.

The coating compositions provide excellent UV protection, in which the hydrophobicity and other coating composition characteristics are substantially maintained or unaltered despite long term exposure to UV radiation. The following examples show the effect of exposure to UV radiation to the hydrophobicity of the coating composition.

Example 6

Four samples of Composition A from Example 4 were subjected to UV radiation at a dosage of about 1.05 Watts per square meter ($W/m^2$) for a period of 350 hours, with a measurement of contact angle associated with each sample being recorded at the start (before UV exposure) and after 350 hours of UV exposure:

TABLE 6

| UV Aging Time (hours of exposure at 1.05 $W/m^2$) | Average Contact Angle | | | |
|---|---|---|---|---|
| | Sample 1 | Sample 2 | Sample 3 | Sample 4 |
| 0 | 154.4 | 153.4 | 157.2 | 158.8 |
| 350 | 153.2 | 150.5 | 154.4 | 153.4 |

As indicated by the results, the level of hydrophobicity (indicated by measured average contact angle) of the coating composition samples changed only to a small amount or degree after 350 hours of exposure to UV radiation.

Example 7

The following compositions were prepared and coated on aluminum substrates in a similar manner as described for Example 1, but without molybdenum disulfide provided in the composition. The compositions were subjected to UV radiation at a dosage of about 1.05 $W/m^2$ for a period up to 470 hours, with a measurement of contact angle associated with each composition being recorded at the start (before UV exposure) and at various times up to 470 hours of UV exposure:

TABLE 7

| | Composition 1 | Composition 2 |
|---|---|---|
| Dupont FEP 6322 PZ (fluoropolymers) | 91 wt % | 91 wt % |
| AEROSIL R812S (hydrophobic fumed silica) | 6 wt % | 6 wt % |
| Zano 20 (zinc oxide) | 3 wt % | 0 wt % |
| Zano 20 Plus (zinc oxide) | 0 wt % | 3 wt % |

TABLE 7-continued

| UV Aging Time (hours) at 1.05 W/m$^2$ | Average Contact Angle for Composition 1 | Average Contact Angle for Composition 2 |
|---|---|---|
| 0 | 156.9 | 141.9 |
| 50 | 153.7 | 154.6 |
| 100 | 156.6 | 157.6 |
| 150 | 152.0 | 144.2 |
| 470 | 149.8 | 149.7 |
| 670 | 158.2 | 153.9 |
| 1270 | 143.7 | 144.0 |
| 2470 | 143.8 | 146.9 |

The results indicate that a coating composition that includes one or more polymer binders, such as fluoropolymers, a UV protection agent (such as zinc oxide) and hydrophobic silica provides excellent UV protection in addition to excellent hydrophobicity even after a long term exposure to UV radiation. This is indicated by the measured contact angle data provided in the table above, in which the contact angle for the two compositions changes only to a small degree after an exposure of up to 2470 hours of UV radiation.

Coating compositions such as the types of the previous examples can be used for coating a substrate surface in which abrasion resistance may not be of concern but where hydrophobicity is desired and where such hydrophobicity does not degrade after long term UV exposure. For example, these coating compositions can be applied on the surface of airplane wings or other structural components where hydrophobicity may be desired that does not degrade due to UV exposure.

For conductors or other structures having rounded or non-planar surfaces to be coated, adding molybdenum disulfide to the coating composition further enhances the resistance of the composition to abrasion, as indicated by the test data of Example 8:

Example 8

Four coating compositions were prepared and applied to an aluminum surface in a manner similar to that described in Example 1, where the components of the composition and their weight percentages are set forth in the table below. For each composition, the amount of molybdenum disulfide was varied to determine the resultant effect on wearing of the coating composition after being subjected to an abrasion test. In particular, a Sutherland rub tester was used using a head that weighed 2,711 grams and had a contact area of 1.75 inches by 2 inches. The abrasion material used for the tester was Rhodes American steel wool with #3 coarseness. Testing was performed by determining a degree of superhydrophobicity of the same sample over different abrasion times. In between each measured time, the sample was washed with isopropyl alcohol (IPA) to remove any non-adhered material, and then put in a 150° F. oven had heated for a sufficient time (e.g., about 2-3 minutes) to ensure complete removal of IPA.

A degree of superhydrophobicity was determined in the test by measuring a percentage of area of the abraded coating surface that still exhibits superhydrophobic properties vs. a remaining area of the abraded coating surface that does not exhibit such superhydrophobic properties. For example, prior to starting the abrasion test, each coated surface exhibits a degree of superhydrophobicity of 100%, meaning that the entire surface area to be subjected to the abrasion test is superhydrophobic (for example, the contact angle for a water droplet formed on a surface of the coating is 130° or greater). After each abrasion time, one side of the coated substrate was elevated at a select angle from a support surface and a number of water droplets were dropped onto the abraded area at different locations within the abraded area to determine which sections of the abraded area the water droplets adhered to the surface (indicating a portion or section of the abraded area that is no longer superhydrophobic) and which sections of the abraded area the water droplets rolled off and did not adhere to the abraded surface. Thus, for example, a degree of superhydrophobicity of 80% indicates that, for 80% of the abraded area of the coated surface, no water droplets would adhere to such area (thus indicating that 80% of the abraded area is still superhydrophobic). To state this in an alternative manner, for 20% of the abraded area of the coated surface, the water droplets dropped onto the surface adhered to such abraded area (thus indicating that superhydrophobicity for 20% of the abraded area was lost as a result of degradation or total removal of the coating from such location(s) of the abraded area).

The test data showing the different compositions and the results of the abrasion testing is set forth as follows:

TABLE 8

|  | Composition 1 | Composition 2 | Composition 3 | Composition 4 |
|---|---|---|---|---|
| Dupont FEP 6322 PZ (fluoropolymers) | 91 wt % | 88.35 wt % | 86.67 wt % | 82.73 wt % |
| AEROSIL R812S (hydrophobic fumed silica) | 6 wt % | 5.83 wt % | 5.71 wt % | 5.45 wt % |
| Zano 20 (zinc oxide) | 3 wt % | 2.91 wt % | 2.86 wt % | 2.73 wt % |
| Molybdenum disulfide | 0 wt % | 2.91 wt % | 4.76 wt % | 9.09 wt % |
| Abrasion Time (minutes) |  |  |  |  |
| 0.0 | 100% | 100% | 100% | 100% |
| 1.0 | 100% | 100% | 100% | 100% |
| 3.0 | 0% | 50% | 90% | 100% |
| 3.5 | 0% | 0% | 80% | 100% |
| 4.0 | 0% | 0% | 0% | 100% |
| 4.5 | 0% | 0% | 0% | 80% |
| 5.0 | 0% | 0% | 0% | 0% |
| 6.0 | 0% | 0% | 0% | 0% |

From the test data, it is evident that molybdenum disulfide provides protection of the coating compositions against abrasion, with a greater amount of molybdenum disulfide provided in the coating compositions rendering a more durable composition that can withstand more abrasive forces for a longer time period while still maintaining some level of hydrophobicity.

Figure 3:
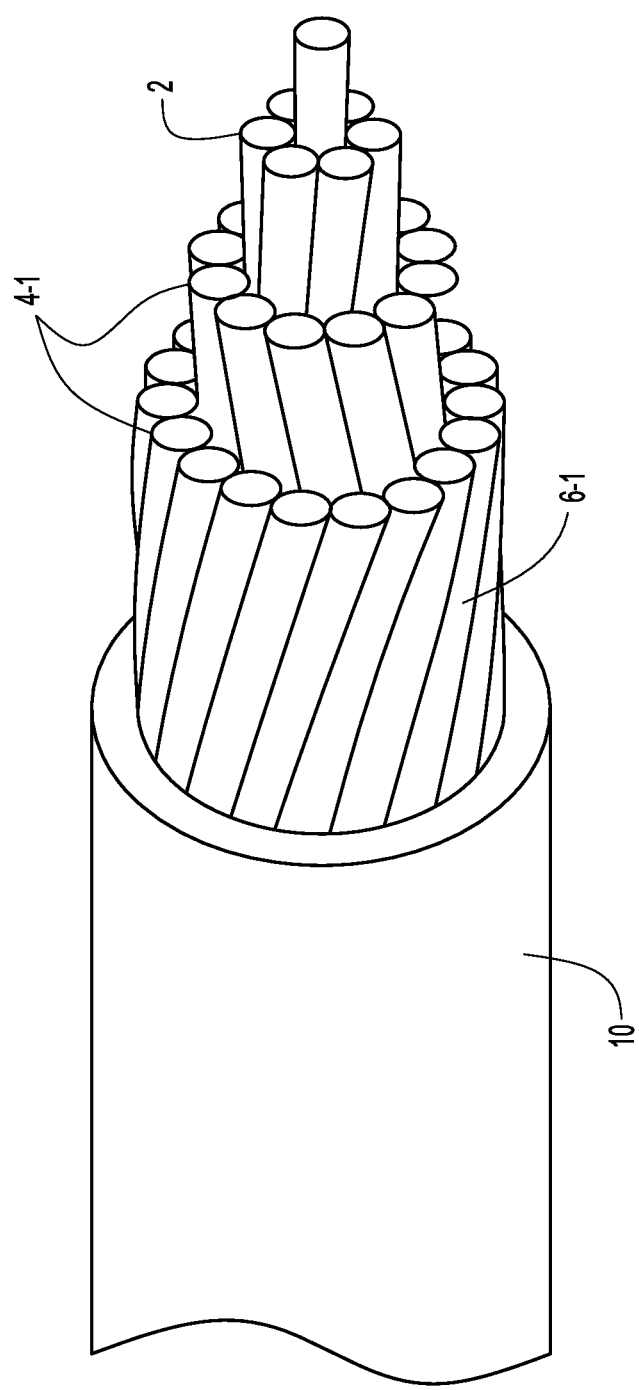
FIG. 3 depicts a side view in partial cross section depicting the conductor cable of FIG. 1 including a coating composition of the type described herein.

The coating compositions can be applied to conductors (for example, ACSS bare overhead conductors) or other suitable substrates at any suitable thicknesses. Non-limiting example thicknesses for the coating compositions that are suitable for overhead bare conductors are from about 0.01 mil (0.00001 inch) to about 30 mil (0.030 inch), with a preferred thickness range being from about 1.0 mil (0.0010 inch) to about 10 mil (0.010 inch). For example, the coating compositions can be applied to a portion of or the entire exterior surface 6-1 or 6-2 of the cable types depicted in FIGS. 1 and 2. FIG. 3 depicts an example embodiment of a coating composition 10 as described herein applied to the exterior (rounded or non-planar) surface of the conductor of FIG. 1. As previously noted, the coating compositions of the present invention can also be applied to one or more individual strands or wires within a conductor (such as any of the previously described ACSS cables), for example, prior to the individual wires being combined with other wires to form the conductor. In addition, the coating compositions can be applied to any one or more types of solid conductors (e.g., a groundwire or any other type of solid conductor) having a variety of different diameters or cross-sectional dimensions.

Coating conductors with the coating compositions as described herein provide a number of beneficial features in addition to the hydrophobic, UV protection and/or abrasion resistant features. For example, in certain environments in which corrosion may be an issue for overhead conductors (such as near coastal areas where the salt content in the air or surrounding environment is high), the coating compositions as described herein provide a barrier to prevent or significantly limit any corrosion of the conductor cable exposed to such corrosive environmental conditions. In other scenarios in which a conductor cable has a metallic surface that is shiny, conventional techniques apply a processing step in which the surface is abraded (roughened) to render the surface non-specular (so as to eliminate or reduce light reflection by overhead cable lines toward airplanes or other aerial equipment). Utilizing the coating compositions as described herein to coat conductors also alleviates the need for abrading the surface of shiny conductors, since the coated conductor provides a non-specular exterior surface for the conductor to which it is coated. Thus, the coating conductors can be coated on a non-abraded surface of a conductor while still providing non-specular properties for the conductor.

Although the disclosed inventions are illustrated and described herein as embodied in one or more specific examples, it is nevertheless not intended to be limited to the details shown, since various modifications may be made therein without departing from the scope of the inventions. Accordingly, it is appropriate that the invention be construed broadly and in a manner consistent with the scope of the disclosure.

What is claimed:

1. A method of providing a coating composition to a substrate surface of a conductor, the method comprising:
    applying a liquid carrier comprising a mixture comprising a polymer binder, one or more silicon dioxide compositions, molybdenum disulfide and one or more UV protection agents to the substrate surface of the conductor to form the coating composition on the substrate surface of the conductor, wherein the substrate surface comprises a portion of an exterior surface of the conductor; and
    drying the substrate surface of the conductor to remove the liquid carrier so as to form the coating composition comprising the mixture adhered to the substrate surface of the conductor;
    wherein the polymer binder comprises a fluoropolymer or an epoxy polymer resin; and
    wherein the coating composition comprises at least about 50% by weight of the polymer binder, from about 0.5% to about 15% by weight of the one or more silicon dioxide compositions, from about 0.1% to about 15% by weight of the molybdenum disulfide, and from about 0.1% to about 10% by weight of the one or more UV protection agents.

2. The method of claim 1, wherein the polymer binder comprises one or more epoxy polymer resins, and the method further comprises: curing the one or more epoxy polymer resins within the liquid carrier applied to the substrate surface.

3. The method of claim 1, wherein applying the mixture to the substrate surface further comprises:
    applying the mixture as a dry powder to the substrate surface; and
    heating the substrate surface to form the coating composition comprising the mixture adhered to the substrate surface.

4. The method of claim 1, wherein applying the mixture to the substrate surface occurs without any abrasion performed on the substrate surface prior to applying the mixture.

5. A bare overhead conductor formed according to the method of claim 1.

6. A method of providing a coating composition to a substrate surface of a conductor, the method comprising:
    applying a liquid carrier comprising a mixture comprising at least about 50% by weight of a polymer binder, from about 0.5% to about 15% by weight of one or more silicon dioxide compositions, from about 0.1% to about 15% by weight of molybdenum disulfide and from about 0.1% to about 10% by weight of one or more UV protection agents to the substrate surface of the conductor to form the coating composition on the substrate surface of the conductor; and
    drying the substrate surface of the conductor to remove the liquid carrier so as to form the coating composition comprising the mixture adhered to the substrate surface of the conductor;
    wherein the polymer binder comprises one or more fluoropolymers, and the coating composition is formed with at least about 50% by weight of the one or more fluoropolymers.

7. A substrate including a surface coated with a coating composition according to the method of claim 6.

* * * * *